United States Patent
Anstey et al.

(10) Patent No.: US 12,065,120 B2
(45) Date of Patent: Aug. 20, 2024

(54) BRAKE CONTROL VALVE ARRANGEMENT

(71) Applicant: KNORR-BREMSE SYSTEME FÜR SCHIENENFAHRZEUGE GMBH, Munich (DE)

(72) Inventors: Nigel Anstey, Melksham (GB); Ben Druett, Melksham (GB); Mark Hemmings, Melksham (GB); Justin Peare, Melksham (GB)

(73) Assignee: KNORR-BREMSE SYSTEME FÜR SCHIENENFAHRZEUGE GMBH (DE)

( * ) Notice: Subject to any disclaimer, the term of this patent is extended or adjusted under 35 U.S.C. 154(b) by 362 days.

(21) Appl. No.: 17/275,652

(22) PCT Filed: Sep. 10, 2019

(86) PCT No.: PCT/EP2019/074271
§ 371 (c)(1),
(2) Date: Mar. 11, 2021

(87) PCT Pub. No.: WO2020/053302
PCT Pub. Date: Mar. 19, 2020

(65) Prior Publication Data
US 2022/0041147 A1  Feb. 10, 2022

(30) Foreign Application Priority Data

Sep. 11, 2018  (EP) ...................... 1813590

(51) Int. Cl.
*B60T 8/94* (2006.01)
*B60T 8/17* (2006.01)
(Continued)

(52) U.S. Cl.
CPC .............. *B60T 8/94* (2013.01); *B60T 8/1705* (2013.01); *B60T 8/1893* (2013.01);
(Continued)

(58) Field of Classification Search
CPC ........ B60T 8/94; B60T 8/1705; B60T 8/1893; B60T 8/3235; B60T 13/665;
(Continued)

(56) References Cited

U.S. PATENT DOCUMENTS

| 7,520,574 B2 * | 4/2009 | Schweikert ............. B60T 17/20 303/128 |
| 7,527,340 B2 * | 5/2009 | Miflin ................... B60T 17/221 303/22.7 |

(Continued)

FOREIGN PATENT DOCUMENTS

| CN | 113104058 A  * | 7/2021 | ............ B60T 13/683 |
| DE | 102018200487 A1 * | 7/2019 | .............. B60T 13/24 |

(Continued)

OTHER PUBLICATIONS

International Search Report and Written Opinion corresponding to PCT/EP2019/074271 dated Nov. 4, 2019.

*Primary Examiner* — Thomas J Williams
(74) *Attorney, Agent, or Firm* — Barnes & Thornburg LLP

(57) ABSTRACT

An electropneumatic rail brake system configured to provide emergency braking including an emergency magnet valve which controls air flow into an emergency regulator valve, which valve has an emergency back-up chamber. The emergency regulator provides an output pressure nominally equal to the variable load pressure and no lower than the tare back-up. The magnet valve is closed when energized and when de-energized, pressure is allowed into the emergency back-up chamber, Regulation of the brake cylinder pressure continues during an emergency application such that the brake cylinder pressure applied during an emergency stop does not drop below a predetermined level. In the event of (Continued)

power-loss during an emergency brake stop, the nominal emergency brake pressure is applied to the brake cylinders.

14 Claims, 2 Drawing Sheets

(51) Int. Cl.
| | |
|---|---|
| *B60T 8/18* | (2006.01) |
| *B60T 8/32* | (2006.01) |
| *B60T 13/66* | (2006.01) |
| *B60T 13/68* | (2006.01) |
| *B60T 15/02* | (2006.01) |
| *B60T 15/20* | (2006.01) |
| *B60T 17/22* | (2006.01) |

(52) U.S. Cl.
CPC .......... *B60T 8/3235* (2013.01); *B60T 13/665* (2013.01); *B60T 13/683* (2013.01); *B60T 15/021* (2013.01); *B60T 15/027* (2013.01); *B60T 15/20* (2013.01); *B60T 17/221* (2013.01); *B60T 2270/402* (2013.01); *B60T 2270/413* (2013.01); *B60T 2270/88* (2013.01)

(58) Field of Classification Search
CPC ...... B60T 13/683; B60T 15/20; B60T 15/021; B60T 15/184; B60T 15/027; B60T 17/221; B60T 2270/88; B60T 2270/402; B60T 2270/413
See application file for complete search history.

(56) References Cited

U.S. PATENT DOCUMENTS

| | | | |
|---|---|---|---|
| 9,067,572 B2* | 6/2015 | Lichterfeld | B60T 8/1705 |
| 11,702,055 B2* | 7/2023 | Hemmings | B60T 13/683 303/8 |
| 2012/0286583 A1 | 11/2012 | Ichikawa et al. | |
| 2018/0215365 A1 | 8/2018 | Tione et al. | |
| 2022/0041147 A1* | 2/2022 | Anstey | B60T 8/94 |

FOREIGN PATENT DOCUMENTS

| | | |
|---|---|---|
| EP | 1588913 A1 | 10/2005 |
| GB | 2359599 A | 8/2001 |
| WO | 2011086029 A2 | 7/2011 |
| WO | 2013144543 A2 | 10/2013 |
| WO | 2015181764 A1 | 12/2015 |

* cited by examiner

BRAKE CONTROL VALVE ARRANGEMENT

CROSS REFERENCE AND PRIORITY CLAIM

This patent application is a U.S. National Phase of International Patent Application No. PCT/EP2019/074271 filed Sep. 11, 2019, which claims priority to European Patent Application No. 18193590.9, the disclosure of which being incorporated herein by reference in their entireties.

FIELD

Disclosed embodiments relate to an electropneumatic brake system for a rail vehicle for a railway vehicle brake system and in particular to a vent valve arrangement for use in the remote release and emergency braking functions.

BACKGROUND

In known systems, the available pneumatic brake force is set so that the brake force required to support the maximum deceleration of the vehicle, with its current load, is available and can be applied to the brake cylinders to provide a fully pneumatic emergency brake stop. During service braking the applied brake pressure (i.e., the pressure in the brake cylinders) is regulated to a level below the available pressure, according to the actual brake demand (e.g., selected brake step) and the brake force provided by other brake sub-systems (e.g., electrodynamic- or track-brakes).

SUMMARY

Disclosed embodiments provide a brake system that enables a more precise control of the brake pressures resulting in a lower likelihood of under or over braking, in particular, but not exclusively, during emergency braking.

BRIEF DESCRIPTION OF FIGURES

Exemplary embodiments are described in great detail with reference to the drawings in which.

DETAILED DESCRIPTION

In known systems such as that disclosed in EP1588913 and GB2359599, the available pneumatic brake force is set so that the brake force required to support the maximum deceleration of the vehicle, with its current load, is available and can be applied to the brake cylinders to provide a fully pneumatic emergency brake stop. During service braking the applied brake pressure (i.e., the pressure in the brake cylinders) is regulated to a level below the available pressure, according to the actual brake demand (e.g., selected brake step) and the brake force provided by other brake sub-systems (e.g., electrodynamic- or track-brakes).

The system has been proven in the field but suffers from variations in brake-pad friction that may occur during the brake application and from any mechanical factors that may cause the brake actuation on any bogie to generate a brake force different to that calculated from the brake system specification. These mechanical effects can lead to both under braking and over braking of the train.

WO2011086029 discloses a brake arrangement of a railway vehicle having an emergency brake comprising a solenoid working on the principle of de-energizing to close, which solenoid in normal operation is powered and held in the open position. This system, which has not been commercialised, suffers from similar problems.

Disclosed embodiments seek to provide a brake system that enables a more precise control of the brake pressures resulting in a lower likelihood of under or over braking, in particular, but not exclusively, during emergency braking.

The concept advantageously provides the expected vehicle deceleration rate, for a given brake step independently from the variations in brake-pad friction that may occur during the brake application and from any mechanical factors that may cause the brake actuation on any bogie to generate a brake force different to that calculated from the brake system specification.

To allow deceleration control of the pneumatic brakes (both emergency and service brake), the available brake force must set at a level above that derived from the brake calculations, in order that it can be increased during a brake application to offset any reduction of the brake force caused by the brake system's mechanical components including the brake pads. Depending on the control algorithm, the reduction in brake force may be train wide or segment wide. Likewise the deceleration control may require reduction of the brake force and hence applied brake pressures to counteract any over-braking caused by the mechanics of the brake system.

Figure 1:
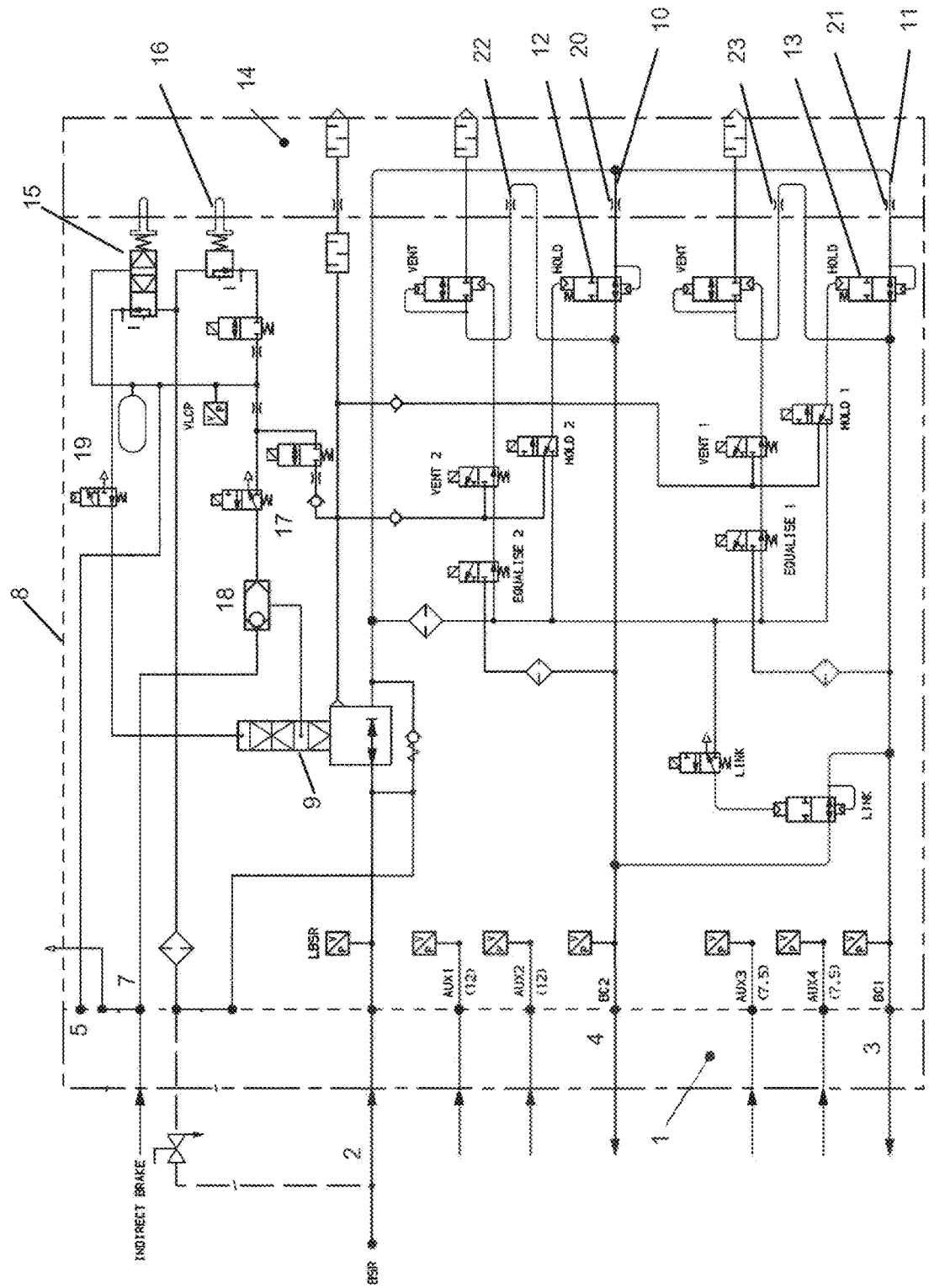
FIG. 1 shows a pneumatic schematic of the brake valve arrangement.

FIG. 1 shows a pneumatic schematic of the brake valve arrangement comprising a manifold 1 which receives the main brake supply pressure 2 and provides the pneumatic connection to brake cylinders 3, 4. The manifold provides further pneumatic connections from an optional external load weigh connection 5 and the distributor valve 7. The load weigh input in standard use is measured by one or two of the auxiliary transducers.

The pneumatic valve unit 8 houses the main relay regulator 9, which receives an inlet pressure from the brake supply pressure 2. The outlet of the main relay regulator 9 is connected to the respective inlets 10, 11 of the control valves 12, 13 via the configuration module 14, described in greater detail below.

The main relay regulator 9 is piloted by pressures from the emergency regulator 15, which provides the tare back-up setting level and the crush regulator 16. The regulators limit the pilot pressure levels. The outputs of the double check valve 18 and emergency regulator pilot the main relay regulator 9. The tare back-up setting is the minimum pressure available in an emergency in the event that the variable load control pressure (VLCP) pressure is less than the tare setting. The crush regulator setting level is the maximum pressure available to the VLCP control valves. The emergency regulator 15 is connected to the main supply pressure 2 and the pilot input of the main relay regulator 9 via the Emergency brake loop solenoid 19.

The crush regulator 16 receives a pneumatic input from the main brake supply pressure 2 and the outlet is connected to an inlet and vent valve arrangement, which control the actual pressure to a remote release valve 17 which is connected to the outlet of the main relay regulator 9. The crush regulator is therefore connected to the main relay regulator 9 via a remote release valve 17. The optional low weigh connection is provided with a path to the inlet of the remote release valve 17. A double check valve 18 is provided in the path between the remote release valve 17 and the main relay regulator 9, which double check valve is also pneumatically connected to the indirect brake input 7.

The control valves 12, 13 each comprise an inlet and vent membrane valve controlled by a respective solenoid and a further solenoid arranged to equalise the pressures across the vent membranes. The outlets of the control valves 12 and 13 is connected to a respective brake cylinder. A link valve comprising a membrane valve and solenoid provides a pneumatic connection between the outlets of the respective control valves 12,13.

As described above, the outlet of the main relay regulator 9 is connected to the configuration module 14. The configuration module 14 is provided with a respective choke in the pneumatic path 20,21 from the main relay regulator 9 to the inlet of the respective inlet membrane. The outlet of the inlet membrane is pneumatically connected to the vent membrane via a respective choke 22,23 in the configuration module 14. The vent membranes exhaust the brake cylinders via the configuration module.

In use, the brake application time and vent time are determined by the size of the choke holes which enable the standard or desired application and release times to be achieved irrespective of the brake cylinder volume. This ensures a predictable brake cylinder pressure control and wheel slide protection performance.

In the disclosed embodiments, to provide the deceleration control function, regulation of the brake cylinder pressure (by the microcontroller) continues during an emergency application. However, the brake controller must ensure that the brake cylinder pressure applied during an emergency stop does not drop below a minimum level and that, in the case of power-loss during an emergency brake stop, the nominal emergency brake pressure the pressure determined from the brake calculations as providing the required emergency deceleration for the vehicle's current load is applied to the brake cylinders.

Furthermore to ensure that the brake valve arrangement, which is ideally SIL3 for emergency braking, provides a minimum level of emergency brake force whilst the brake cylinder pressure is being regulated by the microcontroller, which will typically be SIL2, the brake cylinder pressure is independently monitored by electronics or an electronic logical device (FPGA) which will detect the condition where the brake cylinder pressure falls below a pre-configured percentage of the nominal emergency brake pressure.

Likewise this monitoring system can also ensure that the applied brake pressure does not exceed a pre-defined upper limit and thereby provides over-braking protection. Protection against under-braking is only active during an emergency brake application; otherwise brake release and low brake steps would not be possible in service brake mode. Protection against over-braking is active in both emergency and service brake modes.

In emergency brake mode, the brake cylinder monitoring electronics or logic device disables brake cylinder pressure regulation by the microcontroller (thus also disabling control by the head-end device) and applies the nominal emergency pressure level at the brake cylinders in a manner analogous to the standard known emergency brake application.

In service brake operation, the brake cylinder monitoring electronics or logic device will operate to release the brake cylinder pressure (on detecting over-pressure). This is compatible with the release functionality described below As WSP remains operation during an emergency brake application provided the unit is powered), WSP operation can occur whilst controlled emergency brake is active. To control wheel-slide and optimise the available adhesion during an emergency brake stop, WSP control activity may cause the brake cylinder pressure to fall below the minimum pressure level defined for controlled emergency brake. Monitoring electronics may be provided to prevent an immediate cut out of functionality in the event of an under-pressure being detected. As this pressure reduction is acceptable, control of the brake cylinder pressure by the WSP System will prevent the monitoring electronics/logic device from forcing the under-pressure trip. WSP activity used by the monitoring electronics/logic device is detected at the point of actuation of the valves, so that any modulation of the pressure (hold or vent) by the WSP control disables the under-pressure trip. The WSP operation is itself monitored by high integrity (SIL3) electronics (or electronic logic device) to prevent prolonged reduction of the brake cylinder pressure by the WSP control. Operation of these electronics will ensure that the valves cannot be continuously driven by the WSP operation to maintain a low pressure, thus ensuring that the monitoring electronics/logic device is not permanently prevented from acting on an under-pressure condition.

Figure 2:
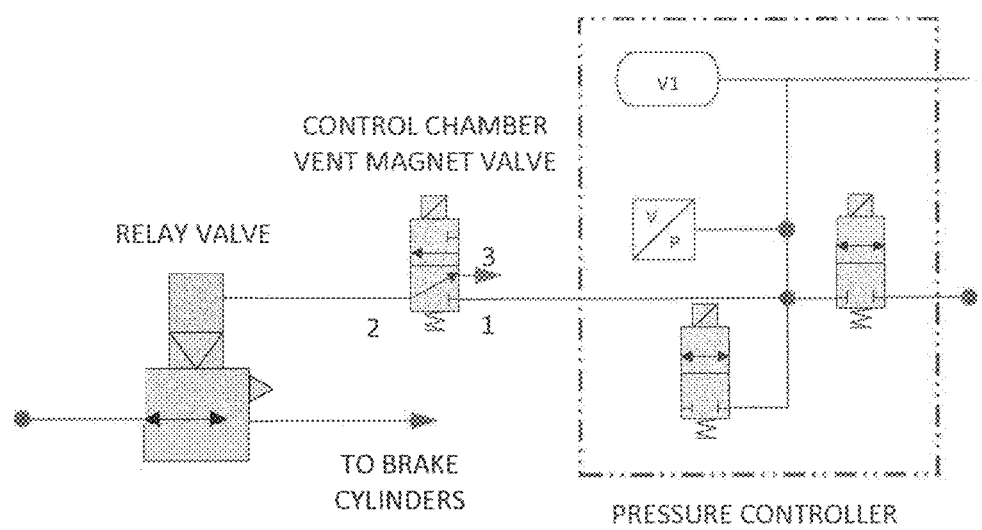
FIG. 2 shows a schematic of the remote release valve 17 and associated pressure controller.

FIG. 2 shows a schematic of the remote release valve 17 and associated pressure controller. The remote release valve has the following port connections: Port 1: pressure controller; Port 2: Relay valve control chamber, Port 3 connected to atmosphere.

When the remote release valve 17, a solenoid, is de-energised: Port 2 connected to Port 3, Port 1 blocked; when it is energised Port 1 is connected to Port 2 and Port 3 blocked. The pneumatic relay valve, equivalent to relay valve 9 in FIG. 1 has control input to output ratio=1:1.

The valve arrangement provides or enables the following functionality:

In the event of a loss of electrical power supply to the brake control valve, the service brake should be released if applied and further reapplication prevented. This is achieved in normal running condition with power available as the solenoid valve 17 is energised connecting the control chamber to the VLCP pressure controller through the valve Port 2 to Port 1. The relay valve provides an output equal to the VLCP which the service brake controls.

In the event of a loss of electrical power, the solenoid 17 de-energises and drops out venting the control chamber pressure to atmosphere through the valve Port 2 to Port 3. The relay valve now vents the output pressure to zero; any brake cylinder pressure will now back feed through the service brake control membranes, as these will not retain pressure if the supply pressure is removed. Hence brake release is achieved and the supply pressure to the membranes in the hold valves is removed, preventing any subsequent service brake application.

In the event of the controlled emergency braking exceeding the safety envelope the FPGA will override the controlled emergency braking and apply a pneumatic only controlled load weighed emergency brake. This is achieved by disabling the service brake (i.e., opening the hold valves and closing the vent valves) and de-energising the control chamber vent magnet valve 17. This vents the control chamber pressure to atmosphere through magnet valve Port 2 to Port 3. This pressure can be set at an enhanced value of the load weighed level to enable emergency braking functionality. An exemplary value of the enhanced value is 125%.

The control chamber diaphragm effective area provides a 1:1 ratio between the control chamber and the output pressures. If the control chamber is not vented the output pressure to the brake cylinders would be 125% of the load weighed level required, i.e., 25% overbraked.

At the initiation of the emergency brake application the controlled emergency braking will become active, the emergency magnet valve, which when energised is closed, will drop out allowing pressure into the emergency back-up chamber. The pressure level is set by the emergency regulator. The emergency regulator is designed to provide an output pressure nominally equal to the variable load pressure VLCP and no lower than the tare back-up setting.

The emergency back-up chamber diaphragm effective area provides a 0.8:1 ratio between the emergency back-up chamber and output pressures—the 0.8 being the inverse of the enhanced value of the load weigh level. However it has a 1:1 ratio with the control chamber. During controlled emergency brake the pressures in the control chamber and emergency back-up chamber are equal. Therefore there is no additive downward force to the diaphragm pile.

If the FPGA decides to override the controlled emergency brake and vents the VLCP pressure from the control chamber the balancing force is now removed on the underside of the emergency back-up chamber diaphragm.

The VLCP pressure is locked in when the control chamber vent solenoid is de-energised. This ensures the reference pressure for the emergency regulator, which maintains the emergency back-up chamber pressure, is at the 125% of the nominal load weighed level.

With the control chamber pressure vented, the force exerted from the emergency chamber diaphragm is now active through the diaphragm pile. This force is balanced by the brake cylinder pressure acting on the underside of the control diaphragm. As the emergency back-up chamber diaphragm to brake cylinder diaphragm ratio is 0.8:1.0, this corrects the output pressure in the brake cylinders to the nominal load weighed value, i.e., $1.25 \times 0.8 = 1$ If a fault is detected within the brake control valve such as a 'dragging brake', release of the service brake is enabled, if applied, and further reapplication prevented. This functionality is achieved by an external digital input direct to the FPGA. When the FPGA receives this signal it inhibits the drive to the solenoid 17 which de-energises.

When the solenoid 17 is de-energised the control chamber is vented. The relay valve will now vent the output pressure to zero; any brake cylinder pressure will now back feed through the service brake control membranes, as they cannot retain pressure if the supply pressure is removed. Hence brake release is achieved and the supply pressure to the membranes is removed, preventing any subsequent service brake application.

A further mode of operation allows a vehicle with a faulty direct brake or power supply issues within the train to be moved by a rescue locomotive or recovery train.

When the control chamber magnet valve is de-energised the control chamber is vented. The relay valve will now vent the output pressure to zero; any brake cylinder pressure will now back feed through the service brake control membranes and brake release will be achieved.

The first indirect brake pressure application will now switch the double check valve 18 closing the route to exhaust through the magnet valve (Port 2 to Port 3) and connecting the indirect brake input port to the control chamber.

The emergency brake loop (EBL) 19 must be high in order to achieve brake release in this mode of operation. If the EBL drops low the output resulting in the brake cylinders will depend on which of the two chambers, control or emergency back-up provide the highest force.

The invention claimed is:

1. An electropneumatic brake system for a rail vehicle configured to provide emergency braking, the electropneumatic brake system comprising:
    brake cylinders for applying a brake force;
    emergency regulator valve that has an emergency back-up chamber; and
    an emergency magnet valve,
    wherein the emergency regulator valve is adapted to provide an output pressure nominally equal to a variable load pressure and at a tare back-up setting when the variable load pressure is lower than the tare back-up setting, and is coupled to a main relay regulator via direct connection between the main relay regulator and the emergency magnet valve,
    wherein the emergency magnet valve is controlled by a first electronic control unit that regulates brake cylinder pressure,
    wherein the emergency magnet valve is closed when energised,
    wherein, when the emergency magnet valve is de-energised, pressure is allowed into the emergency back-up chamber,
    wherein regulation of a brake cylinder pressure by the first electronic control unit continues during an emergency application such that the brake cylinder pressure applied during an emergency stop does not drop below a predetermined level, and
    wherein, in the event of power-loss during an emergency brake stop, a nominal emergency brake pressure is applied to the brake cylinders.

2. The electropneumatic rail brake system of claim 1, further comprising a second electronic control unit that provides a predetermined level of emergency brake force while the brake cylinder pressure is being regulated by the first electronic control unit, the brake cylinder pressure being independently monitored by the second electronic control unit, wherein the second electronic control unit is adapted to detect when the brake cylinder pressure falls below a predetermined amount or percentage of the nominal emergency brake pressure.

3. The electropneumatic rail brake system of claim 2, wherein the second electronic control unit is configured to ensure that the applied brake pressure does not exceed a pre-defined upper limit.

4. The electropneumatic rail brake system of claim 1, wherein protection against under-braking is active only during an emergency brake application.

5. The electropneumatic rail brake system claim 1, wherein protection against over-braking is active in both emergency and service brake modes.

6. The electropneumatic rail brake system of claim 2, wherein during emergency braking, the second electronic control unit disables brake cylinder pressure regulation by the first electronic control unit and applies the nominal emergency pressure level to the brake cylinders.

7. The electropneumatic rail brake system of claim 3, wherein during emergency braking, the second electronic control unit disables brake cylinder pressure regulation by the first electronic control unit and applies the nominal emergency pressure level to the brake cylinders.

8. The electropneumatic rail brake system of claim 4, wherein during emergency braking, a second electronic control unit disables brake cylinder pressure regulation by the first electronic control unit and applies the nominal emergency pressure level to the brake cylinders.

9. The electropneumatic rail brake system of claim 5, wherein during emergency braking, a second electronic control unit disables brake cylinder pressure regulation by the first electronic control unit and applies the nominal emergency pressure level to the brake cylinders.

10. The electropneumatic rail brake system of claim 2, wherein protection against under-braking is active only during an emergency brake application.

11. The electropneumatic rail brake system of claim 3, wherein protection against under-braking is active only during an emergency brake application.

12. The electropneumatic rail brake system of claim 2, wherein protection against over-braking is active in both emergency and service brake modes.

13. The electropneumatic rail brake system of claim 3, wherein protection against over-braking is active in both emergency and service brake modes.

14. The electropneumatic rail brake system of claim 4, wherein protection against over-braking is active in both emergency and service brake modes.

\* \* \* \* \*